(12) United States Patent
Watanabe et al.

(10) Patent No.: US 8,130,896 B2
(45) Date of Patent: Mar. 6, 2012

(54) METHOD OF CONTROLLING CRITICALITY OF NUCLEAR FUEL CYCLE FACILITY, METHOD OF PRODUCING URANIUM DIOXIDE POWDER, REACTOR FUEL ROD, AND FUEL ASSEMBLY

(75) Inventors: Shoichi Watanabe, Yokohama (JP); Ishi Mitsuhashi, Yokosuka (JP); Kenichi Yoshioka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 562 days.

(21) Appl. No.: 12/120,518

(22) Filed: May 14, 2008

(65) Prior Publication Data
US 2009/0028284 A1   Jan. 29, 2009

(30) Foreign Application Priority Data
May 15, 2007   (JP) .................................. 2007-128975

(51) Int. Cl.
*G21C 3/00* (2006.01)
(52) U.S. Cl. ...................................................... 376/419
(58) Field of Classification Search .................... 376/419
See application file for complete search history.

(56) References Cited

FOREIGN PATENT DOCUMENTS

| JP | 62-47583 | 3/1987 |
|---|---|---|
| JP | 63-133086 | 6/1988 |
| JP | 64-028587 | 1/1989 |
| JP | 06-118188 | 4/1994 |
| JP | 2001-116875 | 4/2001 |
| JP | 2004-177241 | 6/2004 |
| JP | 2004177241 A | * 6/2004 |

OTHER PUBLICATIONS

Machine Translation of JP 2004-177241 (Azumi et al.).*
Nuclear Data Center at Japan Atomic Energy Agency, JENDL-3.3, [online], retrieved from the internet <URL: http://wwwndc.tokai-sc.jaea.go.jp/jendl/j33/J33_J.html>.
Nuclear Materials Regulation Division/Nuclear Safety Bureau/Science and Technology Agency, "Nuclear Criticality Safety Handbook", Nikkan-shobou, 1988.
Thermal and Nuclear Power Engineering Society, "Atomic Fuel Cycle and Disposal Treatment", 1986.
Tokutei No Uran Kakou Shisetsu No Tameno Anzen Shishin (Safety Review Guideline for Specific Uranium Processing Facility).
Japanese Office Action dated Mar. 8, 2011, issued in the corresponding Japanese Patent Application No. 2007-128975.

* cited by examiner

*Primary Examiner* — Rick Palabrica
*Assistant Examiner* — Erin M Leach
(74) *Attorney, Agent, or Firm* — Oblon, Spivak, McClelland, Maier & Neustadt, L.L.P.

(57) ABSTRACT

A method of controlling the criticality of a nuclear fuel cycle facility includes steps of producing a reactor fuel by adding less than 0.1% by weight of gadolinia to a uranium dioxide powder with a uranium enrichment of greater than 5% by weight and controlling the effective neutron multiplication factor of a uranium dioxide system in a step of handling the reactor fuel to be less than or equal to the maximum of the effective neutron multiplication factor of a uranium dioxide system with a uranium enrichment of 5% by weight.

1 Claim, 14 Drawing Sheets

CONVENTIONAL EXAMPLE
③ : FUEL ROD (URANIUM ENRICHMENT OF 3WT%)
④ : FUEL ROD (URANIUM ENRICHMENT OF 4WT%)
⑤ : FUEL ROD (URANIUM ENRICHMENT OF 5WT%)
⑥ : FUEL ROD (URANIUM ENRICHMENT OF 6WT%)
⑦ : FUEL ROD (URANIUM ENRICHMENT OF 7WT%)
⑧ : FUEL ROD (URANIUM ENRICHMENT OF 8WT%)
G : FUEL ROD INCLUDING 6WT% GADOKINIA (URANIUN ENRICHMENT OF 6WT%)
W : WATER ROD

PRESENT INVENTION
③ : FUEL ROD (URANIUM ENRICHMENT OF 3WT%)
④ : FUEL ROD (URANIUM ENRICHMENT OF 4WT%)
⑤ : FUEL ROD (URANIUM ENRICHMENT OF 5WT%)
⑥ : FUEL ROD INCLUDING 53 PPM GADOLINIA (URANIUM ENRICHMENT OF 6WT%)
⑦ : FUEL ROD INCLUDING 110 PPM GADOLINIA (URANIUM ENRICHMENT OF 7WT%)
⑧ : FUEL ROD INCLUDING 170 PPM GADOLINIA (URANIUM ENRICHMENT OF 8WT%)
G : FUEL ROD INCLUDING 6WT% GADOLINIA (URANIUN ENRICHMENT OF 6WT%)
W : WATER ROD

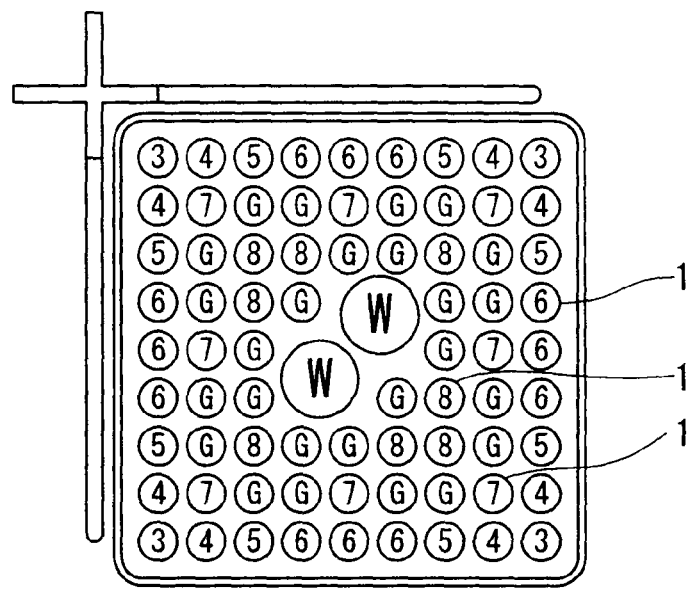

CONVENTIONAL EXAMPLE

③ : FUEL ROD (URANIUM ENRICHMENT OF 3WT%)
④ : FUEL ROD (URANIUM ENRICHMENT OF 4WT%)
⑤ : FUEL ROD (URANIUM ENRICHMENT OF 5WT%)
⑥ : FUEL ROD (URANIUM ENRICHMENT OF 6WT%)
⑦ : FUEL ROD (URANIUM ENRICHMENT OF 7WT%)
⑧ : FUEL ROD (URANIUM ENRICHMENT OF 8WT%)
 G : FUEL ROD INCLUDING 6WT% GADOKINIA
     (URANIUN ENRICHMENT OF 6WT%)
 W : WATER ROD

PRESENT INVENTION

③ : FUEL ROD (URANIUM ENRICHMENT OF 3WT%)
④ : FUEL ROD (URANIUM ENRICHMENT OF 4WT%)
⑤ : FUEL ROD (URANIUM ENRICHMENT OF 5WT%)
⑥ : FUEL ROD INCLUDING 53 PPM GADOLINIA
    (URANIUM ENRICHMENT OF 6WT%)
⑦ : FUEL ROD INCLUDING 110 PPM GADOLINIA
    (URANIUM ENRICHMENT OF 7WT%)
⑧ : FUEL ROD INCLUDING 170 PPM GADOLINIA
    (URANIUM ENRICHMENT OF 8WT%)
 G : FUEL ROD INCLUDING 6WT% GADOLINIA
     (URANIUN ENRICHMENT OF 6WT%)
 W : WATER ROD

FIG. 10

METHOD OF CONTROLLING CRITICALITY OF NUCLEAR FUEL CYCLE FACILITY, METHOD OF PRODUCING URANIUM DIOXIDE POWDER, REACTOR FUEL ROD, AND FUEL ASSEMBLY

BACKGROUND OF THE INVENTION

1. Field of the Invention

The present invention relates to a method of controlling the criticality of nuclear fuel cycle facilities, a method of producing uranium dioxide powders ($UO_2$ powders) that are reactor fuels ($UO_2$), a reactor fuel rod loaded in a nuclear reactor, and a fuel assembly. The present invention particularly relates to a method of controlling the criticality of a nuclear fuel cycle facility, such as a fuel fabrication facility or a fresh-fuel storage facility, using a reactor fuel rod fabricated using a $UO_2$ powder containing less than 0.1% by weight of gadolinia ($Gd_2O_3$), to a method of producing a $UO_2$ powder, to a reactor fuel rod, and to a fuel assembly. Furthermore, the present invention covers a method of controlling the criticality of a spent-fuel transport/storage cask or a fuel storage pool for storing the fuel assembly.

2. Related Art

In order to enhance the power uprating and operation period extension of nuclear power plants and in order to increase the economic efficiency thereof by suppressing the number of spent fuel assemblies in the future, the uranium enrichment of fuel is preferably increased. The increase in the uranium enrichment of fuel reduces the number of fresh fuel assemblies and the number of spent fuel assemblies per unit electricity generated and also greatly reduces fuel cycle costs.

Plants for fabricating fuel assemblies for commercial light water reactors are usually designed to pass a safety examination for the criticality safety of fuels with a uranium enrichment of up to 5% by weight. The safety examination is performed according to the guideline "KAKOU SHISETSU NO TAMENO ANZEN SHINSA SHISHIN (Safety Review Guideline for Uranium Processing Facility)", whereby the construction of such plants is approved. Fuel storage pools and spent-fuel transport/storage casks are evaluated for criticality safety on the basis of the above concept.

Reactor fuels with a uranium enrichment of greater than 5% by weight (hereinafter referred to as "over -5% reactor fuels") are strictly regulated under the guideline "TOKUTEI NO URAN KAKOU SHISETSU NO TAMENO ANZEN SHINSA SHISHIN (Safety Review guideline for Specific Uranium Processing Facility".

In order to use the over -5% reactor fuels, design changes and/or equipment modifications are required for a fabricating step in view of criticality control. Design changes and/or equipment modifications are also required for a fresh-fuel transportation step, a fresh-fuel storage step, a spent-fuel transportation step, and a spent-fuel storage step. This may offset the reduction in fuel cycle costs due to the increase in the enrichment of reactor fuels.

For the fuel storage pools and the spent-fuel transport/storage casks, the handling of the following assemblies may be restricted because of criticality control, i.e., fuel assemblies including reactor fuel rods with a uranium enrichment of greater than 5% by weight or existing fuel assemblies with a maximum enrichment of 5% by weight or less. This may require equipment modifications.

In order to use the reactor fuels with a uranium enrichment of greater than 5% by weight, such design changes and/or equipment modifications required for each step cause an increase in cost, and therefore, may offset the reduction in fuel cycle costs due to the increase in the enrichment of reactor fuels as described above. Measures need to be taken against this problem. For the use of the reactor fuels with a uranium enrichment of greater than 5% by weight, the upper limit of the uranium enrichment of fuels for commercial light-water reactors is about 10% by weight for practical purposes.

The results of the investigation of such measures have shown that equipment modifications are required for steps handling uranium fuels, containing no burnable poison, with an enrichment of greater than 5% by weight in fuel fabrication facilities.

For the transportation and storage of fresh and spent fuel assemblies, the modification of transportation casks and transportation equipment may be avoided by making use of the reactivity-suppression effect (gadolinia credit) of a high concentration (several weight percent) of gadolinia, which is a burnable poison widely used for burnable poison-containing fuel assemblies.

Upon the implementation of the above measures, the type and concentration of a burnable poison added to reactor fuels are important.

Gadolinia, which is a burnable poison widely used for fuel rods for light-water reactors, has a large neutron absorption cross-section and high reactivity-suppression effect.

Erbium oxide ($Er_2O_3$) and boron (B) have a thermal neutron absorption cross-section less than that of gadolinium (Gd) and are effective in ensuring criticality safety in such a manner that a slight amount of erbium oxide is added to $UO_2$ pellets as disclosed in Patent Document 1, or boron is used to coat the surfaces of $UO_2$ pellets or the inner surfaces of fuel cladding tubes as disclosed in Patent Document 2. As shown in FIGS. 1 to 3, which are disclosed in Non-patent Document 1, Er-167, B-10, and Gd-157, which is an isotope of Gd, have a thermal neutron absorption cross-section of about 640, 3,840, and 254,080 barns, respectively, at room temperature (0.025 eV). That is, the thermal neutron absorption cross-sections of Er-167 and B-10 are far less than that of Gd-157.

If a burnable poison is added to a reactor fuel, the burnable poison remains in the reactor fuel at the end of an operation cycle depending on the type of the burnable poison and therefore may cause the reactivity loss of a reactor core. Hence, it is difficult to achieve the reduction in fuel cycle costs due to the increase in the enrichment of reactor fuels.

(Prior Art Documents Cited Above)

Patent Document 1: Japanese Unexamined Patent Application Publication No. 2004-177241

Patent Document 2: Japanese Unexamined Patent Application Publication No. 4-212093

Non-patent Document 1: Nuclear Data Center at Japan Atomic Energy Agency, JENDL-3.3, [online], retrieved from the internet <URL: http://wwwndc.tokai-sc.jaea.go.jp/jendl/j33/J33_J.html>

Non-patent Document 2: Nuclear Materials Regulation Division/Nuclear Safety Bureau/Science and Technology Agency, "Nuclear Criticality Safety Handbook", Nikkanshobou, 1988

Non-patent Document 3: Thermal and Nuclear Power Engineering Society, "Atomic Fuel Cycle and Disposal Treatment", 1986

SUMMARY OF THE INVENTION

The present invention has been made in consideration of the circumstances encountered in the prior art mentioned above, and an object of the present invention is a method of controlling criticality of a nuclear fuel cycle facility and a method of producing uranium dioxide powder for the purpose of reducing an impact on the criticality control of a nuclear fuel cycle facility by adding a slight amount of gadolinia, which is a burnable poison with a large neutron absorption cross-section, to a reactor fuel with a uranium enrichment of greater than 5% by weight and to increase economic efficiency by making use of the reduction in fuel cycle costs due to the increase in the enrichment of the reactor fuel.

In the criticality control of fuel storage pools and spent-fuel transport/storage casks, the handling of the following assemblies may be restricted; that is: fuel assemblies including reactor fuel rods with a uranium enrichment of greater than 5% by weight or fuel assemblies with a uranium enrichment of 5% by weight or less or a uranium enrichment close to 5% by weight among fuel assemblies containing a reactor fuel with a maximum uranium enrichment of 5% by weight or less. It is an object of the present invention to reduce the impact on the criticality control of a fuel storage pool and a spent-fuel transport/storage cask, in consideration that a reactor fuel rod containing a high or slight amount of gadolinia is processed in a fuel fabrication step.

The above and other objects can be achieved according to the present invention by providing, in one aspect, a method of controlling the criticality of a nuclear fuel cycle facility, comprising the steps of:

producing a reactor fuel by adding less than 0.1% by weight of gadolinia to n uranium dioxide powder with a uranium enrichment of greater than 5% by weight; and controlling the effective neutron multiplication factor of a uranium dioxide system in a step of handling the reactor fuel to be less than or equal to maximum of an effective neutron multiplication factor of the uranium dioxide system with a uranium enrichment of 5% by weight.

In the above aspect, the method may further include the step of setting an amount of gadolinia added to the uranium dioxide powder with a uranium enrichment of greater than 5% by weight such that the maximum of the effective neutron multiplication factor of the uranium dioxide powder with a uranium enrichment of greater than 5% by weight is less than or equal to that of the uranium dioxide powder with a uranium enrichment of 5% by weight, in the maximums of effective neutron multiplication factors specified by constraints for ensuring the subcriticality of mass control not handling any fuel having a mass exceeding a predetermined value relating to criticality safety design or geometry control not handling any fuel having a size exceeding a predetermined value relating to criticality safety design over the entire range of uranium concentration under such complete submergence conditions that spaces between particles of the uranium dioxide powder with a uranium enrichment of 5% by weight are filled with water and the particles are surrounded by water for a fuel fabrication facility.

It may be further desired that the uranium dioxide powder with a uranium enrichment of greater than 5% by weight has a uranium enrichment of up to 10% by weight and the content of gadolinia in the reactor fuel is within a range from 305 to 915 ppm. In this regard, an amount of gadolinia added to the uranium dioxide powder with a uranium enrichment of greater than 5% by weight is proportional to the uranium enrichment thereof that exceeds 5% and the constant of the proportion is determined by dividing the amount of gadolinia added to a uranium dioxide powder with a uranium enrichment of 10% by weight by five.

In another aspect of the present invention, there is also provided a method of producing a uranium dioxide powder comprising the steps of: reconverting uranium hexafluoride; and adding an aqueous solution of gadolinium nitride to a uranium solution treated in a reconverting step so as to produce a uranium dioxide powder which contains less than 0.1% by weight of gadolinia and which has a uranium enrichment of greater than 5% by weight.

In a further aspect of the present invention, there is also provided a method of producing a uranium dioxide powder comprising the steps of: preparing a first powder mixture by adding about 1% to 10% by weight of gadolinia to a uranium dioxide powder with a uranium enrichment of greater than 5% by weight; and preparing a powder mixture by adding the uranium dioxide powder with a uranium enrichment of greater than 5% by weight to the first powder mixture in several stages so as to produce a uranium dioxide powder which contains less than 0.1% by weight of gadolinia and which has a uranium enrichment of greater than 5% by weight.

In a still further aspect of the present invention, there is also provided a reactor fuel rod comprising: a cylindrical fuel cladding tube including a lower-end plug welded to the lower end thereof; cylindrical fuel pellets packed in the fuel cladding tube; a plenum spring, placed in an upper hollow portion of the fuel cladding tube, for elastically pressing the fuel pellets; and an upper-end plug welded to the lower end of the fuel cladding tube, wherein the fuel pellets are formed from a uranium dioxide powder which contains less than 0.1% by weight of gadolinia and which has a uranium enrichment of greater than 5% by weight.

In a still further aspect of the present invention, there is also provided a fuel assembly for a light-water reactor comprising: a first reactor fuel rod, having a gadolinia content of 0.1% by weight or more, for controlling reactivity and power distribution of a reactor core in operation; and a second reactor fuel rod, of the type mentioned above, which contains fuel pellets formed from a uranium dioxide powder, containing less than 0.1% by weight of gadolinia, having a uranium enrichment of greater than 5% by weight and which has same configuration as that of a reactor fuel rod.

The fuel assembly may further include a third reactor fuel rod with a uranium enrichment of 5% by weight or less.

In a still further aspect of the present invention, there is also provided a method of controlling the criticality of a nuclear fuel cycle facility, comprising: controlling the criticality of a fuel storage pool or a spent-fuel transport/storage cask for storing the fuel assembly mentioned above or a fuel assembly which includes only the third reactor fuel rod mentioned above and which has a gadolinia content of 0.1% by weight or more, wherein the subcriticality of the fuel storage pool or the spent-fuel transport/storage cask is ensured in such a manner that the effective neutron multiplication factor of the fuel assembly is assumed to be the maximum effective neutron multiplication factor of a reactor fuel over the entire period of the burning of the reactor fuel.

According to the present invention, a slight amount of gadolinia, which is a burnable poison having a large neutron absorption cross-section, is uniformly added to a reactor fuel with a uranium enrichment of greater than 5% by weight, whereby influences on measures for controlling the criticality of a nuclear fuel cycle facility can be reduced. Furthermore, economic efficiency can be increased by making use of the reduction in fuel cycle costs due to the increase in the enrichment of the reactor fuel.

In the case where there are constraints on criticality control when a fuel assembly is handled in a fuel storage pool or a spent-fuel transport/storage cask, influences on measures for criticality control can be reduced in consideration that a reactor fuel rod containing a slight or large amount of gadolinia is treated in a fuel fabrication step.

The nature and further characteristic features of the present invention will be made clearer from the following descriptions made with reference to the accompanying drawings.

BRIEF DESCRIPTION OF THE DRAWINGS

In the accompanying drawings:

FIG. 10 is an illustration showing the two-dimensional arrangement pattern of a design example of a conventional replacement fuel assembly (used for two years, having an average burnup of about 70 GWd/t), having an average uranium enrichment of about 6.2% by weight, for boiling-water reactors and also showing that of a fuel assembly, according to a fourth embodiment, including reactor fuel rods fabricated using $UO_2$ powders which slightly contain, for example, less than 0.1% by weight of gadolinia and which have a uranium enrichment of greater than 5% by weight;

DESCRIPTION OF THE PREFERRED EMBODIMENTS

Figure 1:
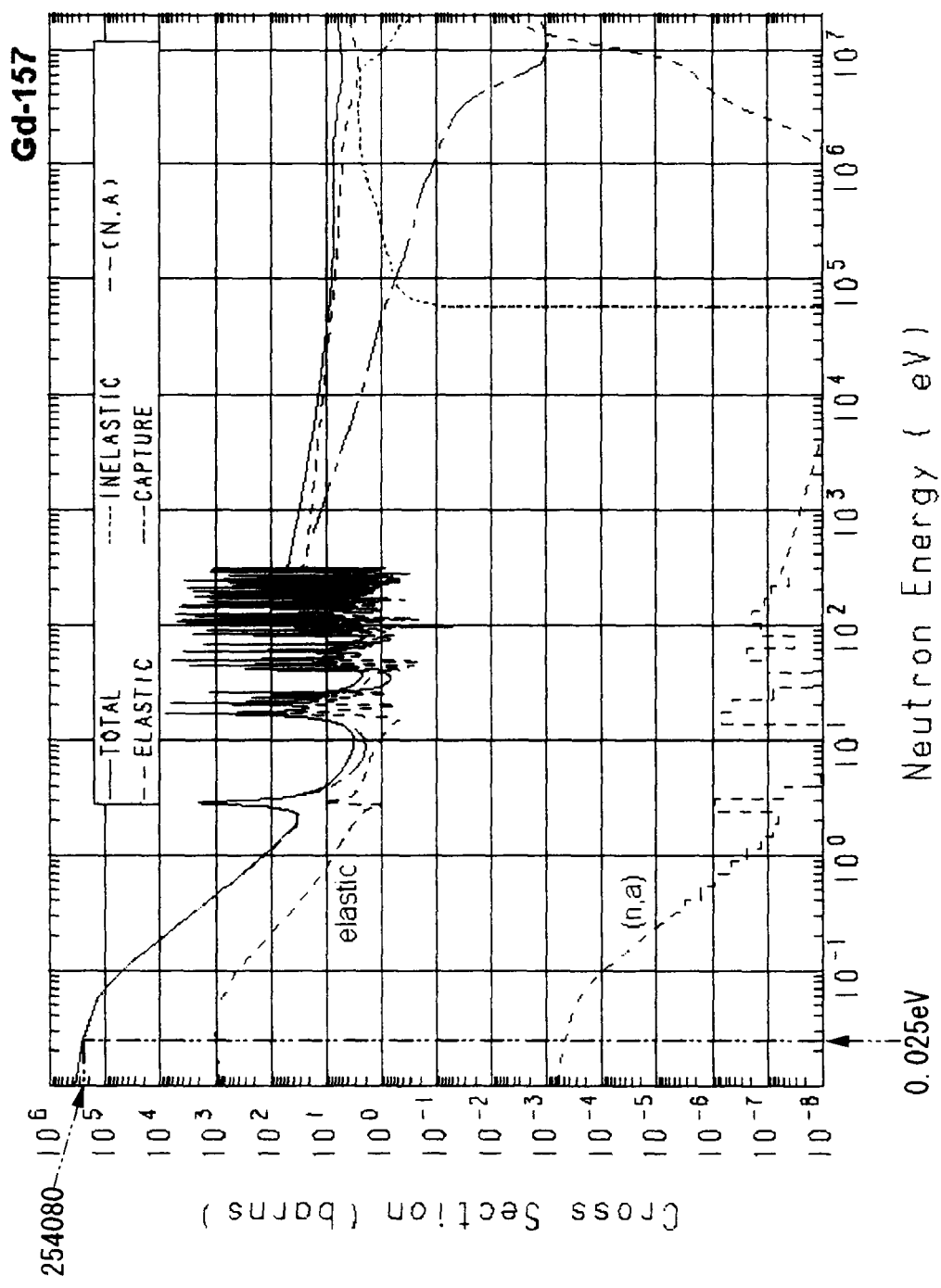
FIG. 1 is a graph showing the relationship between the neutron absorption cross-section (barns) and neutron energy (eV) of Gd-157.
Figure 2:
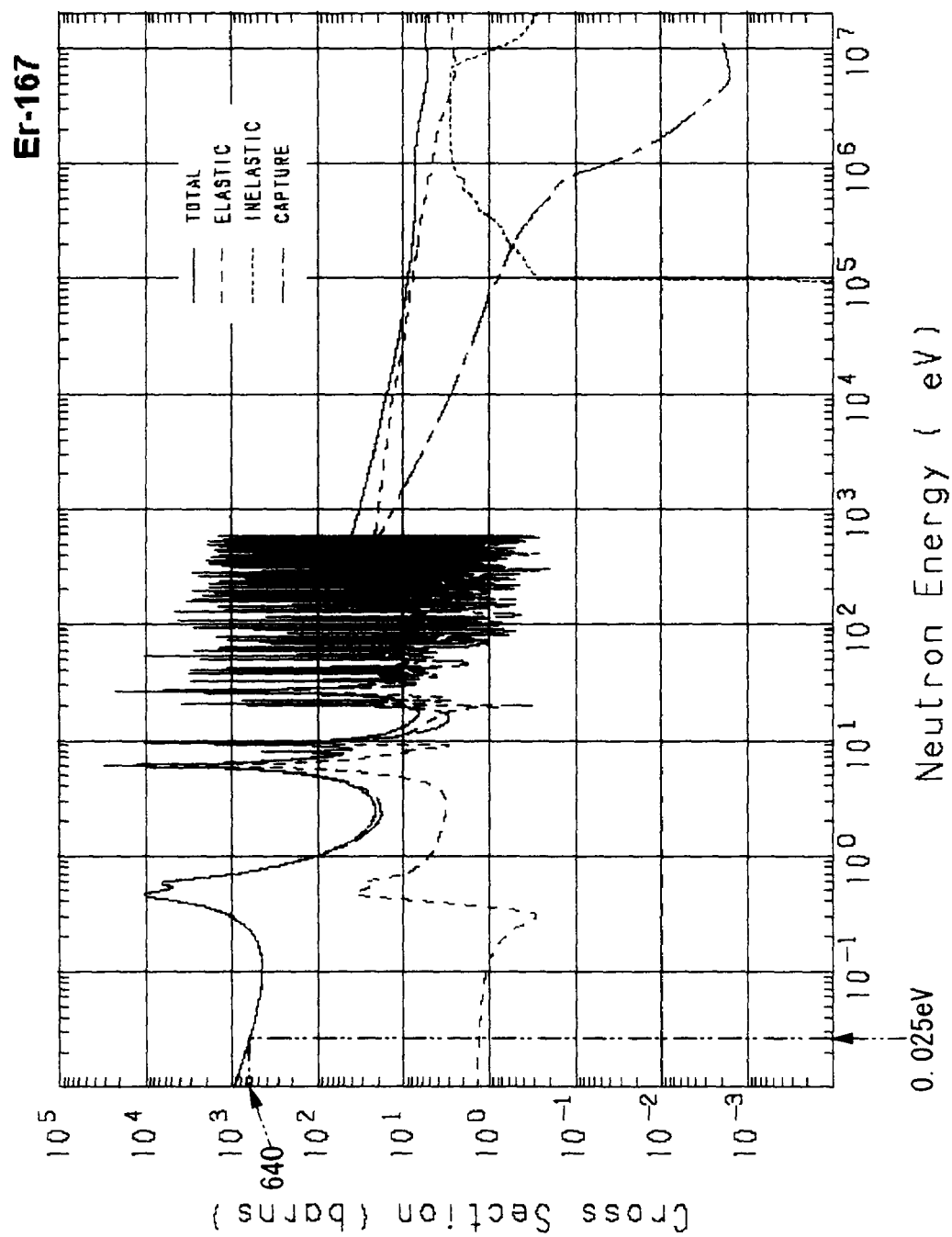
FIG. 2 is a graph showing the relationship between the neutron absorption cross-section (barns) and neutron energy (eV) of Er-167.
Figure 3:
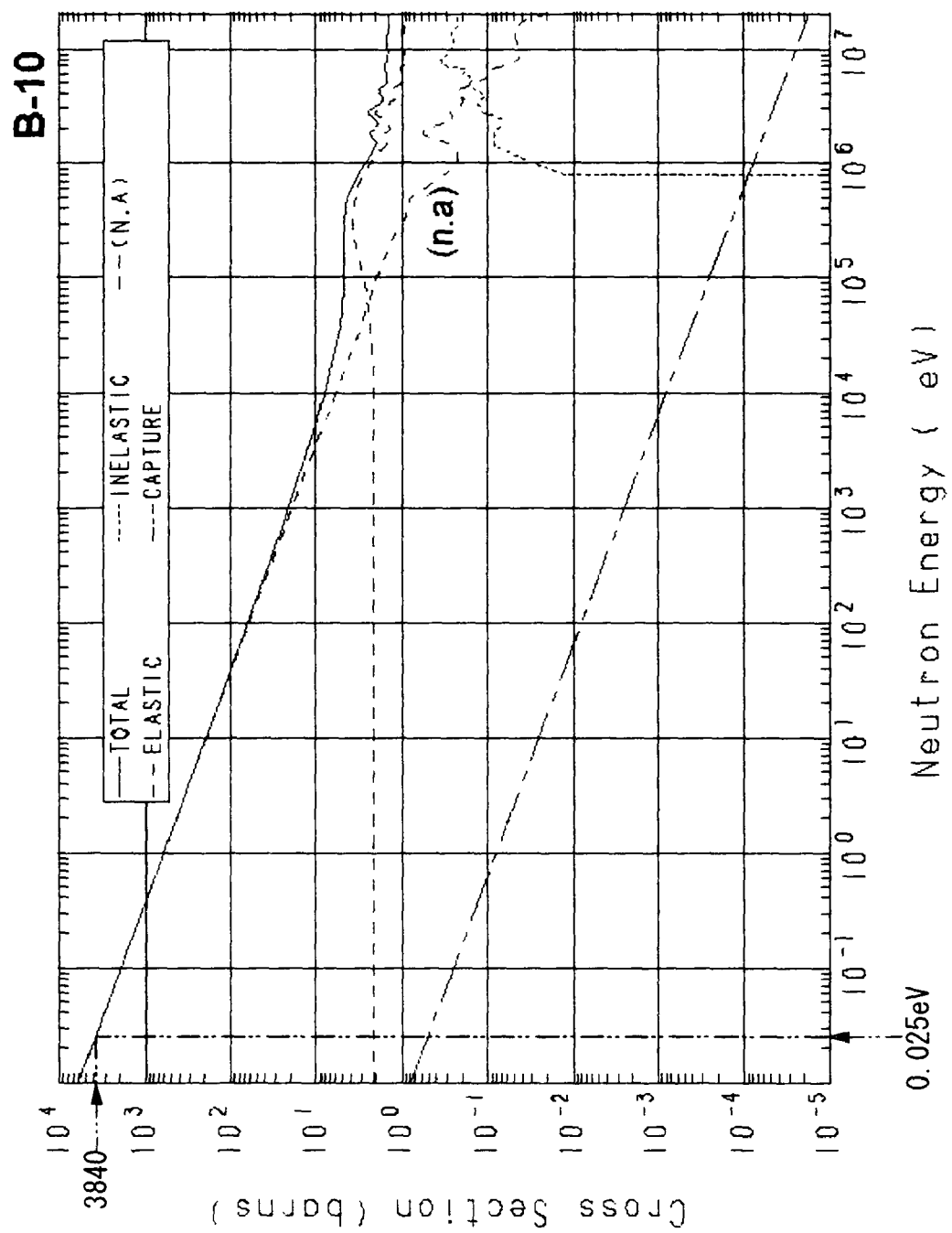
FIG. 3 is a graph showing the relationship between the neutron absorption cross-section (barns) and neutron energy (eV) of B-10.

Embodiments of the present invention will be described hereunder with reference to the accompanying drawings.

The term "reactor fuel" used herein covers powders containing $UO_2$ particles, fuel pellets made from the powders, reactor fuel rods including the fuel pellets, bundles of the reactor fuel rods, and fuel assemblies including the bundles.

The term "uranium oxide system ($UO_2$ system)" used herein means a system in which spaces between powders including partially or entirely $UO_2$ particles, fuel pellets made from a powder containing the $UO_2$ particles, arrangement of such fuel pellets, reactor fuel rods including the fuel pellets, bundles of the reactor fuel rods, and fuel assemblies including the bundles are filled water, and in which the $UO_2$ particles, the fuel pellets, the reactor fuel rods, the bundles, and the fuel assemblies are surrounded by water under given conditions of predetermined size and mass.

In descriptions below, 1 ppm is equal to $1 \times 10^{-4}$ weight percent.

A reactor fuel containing less than 0.1% by weight of gadolinia is hereinafter referred to as a low-gadolinia content fuel. A reactor fuel containing 0.1% by weight or more of gadolinia is hereinafter referred to as a high-gadolinia content fuel.

[First Embodiment]

A method of controlling the criticality of a nuclear fuel cycle facility according to a first embodiment of the present invention will now be described with reference to FIGS. 4 and 5.

Non-patent Document 2 specifies "minimum estimated criticality values" and "minimum estimated criticality lower-limits" that are constraints used in "mass control" not handling any reactor fuel having a mass exceeding a limit on criticality control or "geometry control" not handling any reactor fuel having a size exceeding a limit on criticality control with respect to a uniform $UO_2$-$H_2O$ system that is the strictest model on criticality control in consideration of "complete submergence". Table 1 shows constraints used in a $UO_2$ powder-handling step (hereinafter referred to as a $UO_2$ powder step). The term "estimated criticality value" used herein means such a value that something having a mass or size equal to the value is determined to be critical. The term "estimated criticality lower-limit" used herein means such a value that something having a mass or size less than or equal to the value is determined to be subcritical. Values shown in Table 1 are minimum values over the entire range of the concentration of uranium.

TABLE 1

| | Minimum estimated criticality values | | | | | Minimum estimated criticality lower-limits | | | | |
|---|---|---|---|---|---|---|---|---|---|---|
| | Enrichment (weight percent) | | | | | | | | | |
| | 3 | 4 | 5 | 10 | 20 | 3 | 4 | 5 | 10 | 20 |
| Diameter of infinite cylinders (cm) | — | 38.2 | 25.7 | 20.3 | 17.9 | — | 26.9 | 24.4 | 19.4 | 17.2 |
| Thickness of infinite plates (cm) | — | 13.4 | 11.9 | 8.42 | 6.87 | — | 12.7 | 11.2 | 7.97 | 6.20 |
| Volume of spheres (L) | 45.4 | 32.9 | 27.4 | 15.7 | 10.8 | 40.1 | 29.4 | 24.0 | 14.1 | 9.62 |
| Mass (kgU) | 92.1 | 53.9 | 36.7 | — | — | 79.6 | 45.6 | 33.0 | — | — |

The method of this embodiment is as follows: a slight amount, for example, less than 0.1% by weight of gadolinia is uniformly added to a $UO_2$ powder, handled in fuel fabrication facilities, having a uranium enrichment of greater than 5% by weight, whereby the effective neutron multiplication factor of the mixture is controlled to be less than or equal to the maximum of an effective neutron multiplication factor which is a constraint on mass or geometry control for controlling the criticality safety of a $UO_2$ powder with a uranium enrichment of 5% by weight.

That is, a slight amount of gadolinia is added to the $UO_2$ powder with a uranium enrichment of greater than 5% by weight such that an effective neutron multiplication factor for the mass or geometry control of the $UO_2$ powder with a uranium enrichment of greater than 5% by weight is controlled to be less than or equal to the maximum of an effective neutron multiplication factor for the mass or geometry control for a $UO_2$ powder, shown in Table 1, having a uranium enrichment of 5% by weight. Thus, a constraint on the criticality safety of the $UO_2$ powder with a uranium enrichment of greater than 5% by weight is controlled to be equal to a constraint on the criticality safety of the $UO_2$ powder with a uranium enrichment of 5% by weight.

The term "a uranium enrichment of 5% by weight" used herein covers a range from 4.5% to 5.0% by weight. A $UO_2$ powder with a uranium enrichment of 3% by weight and a $UO_2$ powder with a uranium enrichment of 4% by weight, which are shown in Table 1, are included in this embodiment in addition to the $UO_2$ powder with a uranium enrichment of 5% by weight which is a reference for comparison. Constraints on the $UO_2$ powders with a uranium enrichment of 3% or 4% by weight are severe, and therefore, the amount of gadolinia added thereto becomes large.

Table 1 shows the $UO_2$ powders with a uranium enrichment of 3%, 4%, or 5% and $UO_2$ powders with a uranium enrichment of 10% or 20% by weight. FIG. 4 is a graph showing the content of gadolinia relating to the mass control of 33 kgU of the $UO_2$ powder with a uranium enrichment of 5% by weight.

Figure 4:
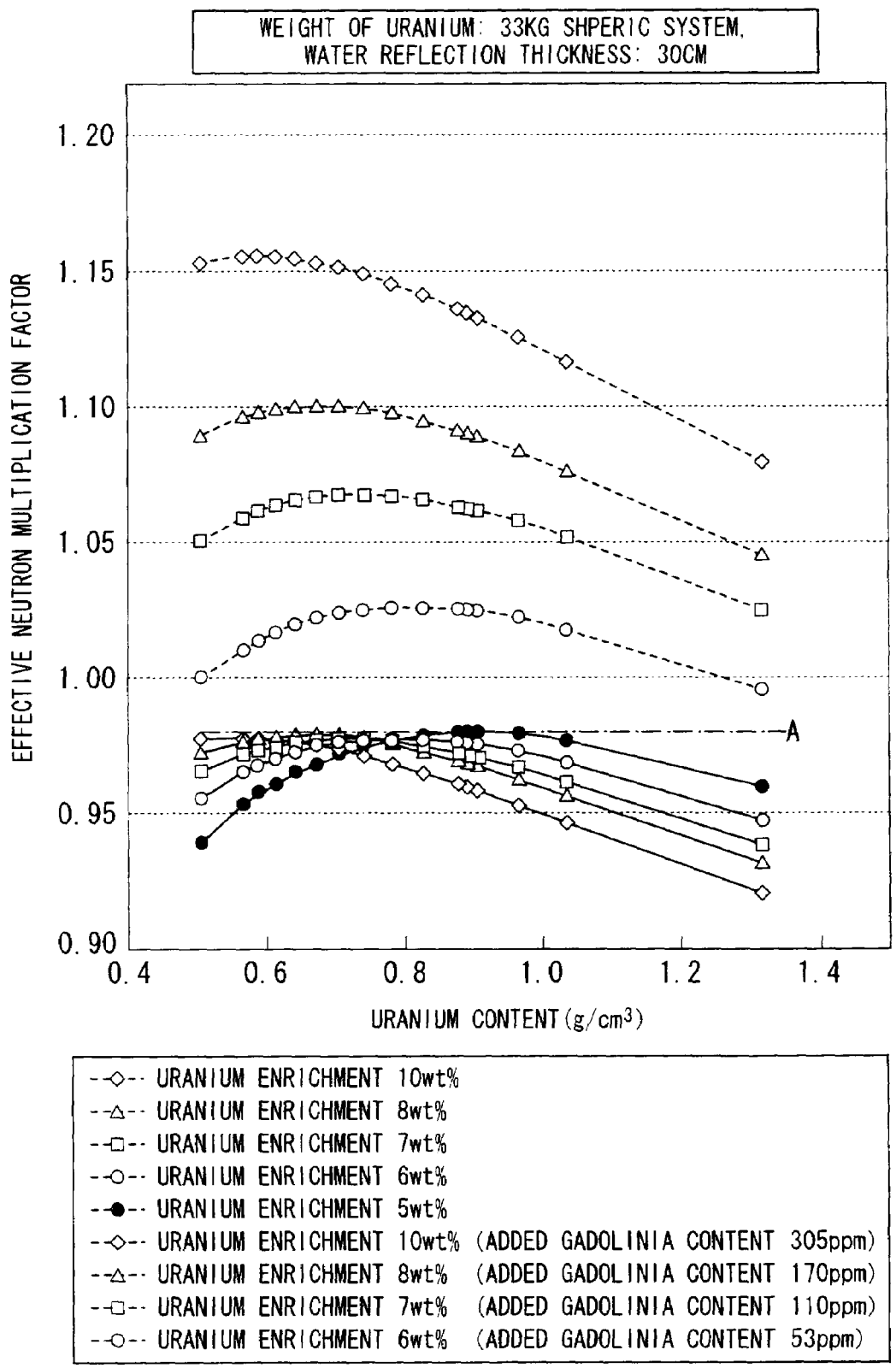
FIG. 4 is a graph showing a technique for setting an amount of gadolinia added to a $UO_2$ powder used in a method, according to a first embodiment of the present invention, of controlling the criticality of a nuclear fuel cycle facility.

With reference to FIG. 4, Line "A" represents the maximum of the effective neutron multiplication factor of the $UO_2$ powder with a uranium enrichment of 5% by weight, the effective neutron multiplication factor giving a mass of 33 kgU at the minimum estimated critical lower-limit of the $UO_2$ powder with a uranium enrichment of 5% by weight over the entire range of the content of uranium. FIG. 4 gives the relationship between the content of gadolinia and the enrichment of uranium that is determined such that the effective neutron multiplication factors of $UO_2$ powders, containing a slight amount of gadolinia, with a uranium enrichment of greater than 5% by weight are less than or equal to the maximum represented by Line "A".

The relationship between the content of gadolinia and the enrichment of uranium is given by a neutron transport calculation performed for a water-reflected spherical system in which spaces between particles of a $UO_2$ powder are filled with water using the content of gadolinia (or the volume of the spherical system) as a parameter. The following results are then obtained; that is: the amount of gadolinia added to each $UO_2$ powder with a uranium enrichment of 6%, 7%, 8%, or 10% by weight is 53, 110, 170, or 305 ppm, respectively.

According to neutron transport calculations performed for an infinite cylinder with a diameter of 24.4 cm, an infinite plate with a thickness of 11.2 cm, and a sphere with a radius of 24.0 cm under the same gadolinia content condition using the content of gadolinia as a parameter, the infinite cylinder, the infinite plate, and the sphere being made of the $UO_2$ powder with a uranium enrichment of 5% by weight, the effective neutron multiplication factors of the $UO_2$ powders, containing a slight amount of gadolinia, with a uranium enrichment of greater than 5% by weight are less than the maximum of the effective neutron multiplication factor of the $UO_2$ powder with a uranium enrichment of 5% by weight and constraint conditions are satisfied.

In a fuel fabrication facility, neutron transport calculations are performed for a step of forming fuel pellets, step of fabricating a reactor fuel rod, and step of fabricating a fuel assembly subsequent to a step of producing a $UO_2$ powder under the same gadolinia content condition, and it is thereby confirmed that the effective neutron multiplication factor of the $UO_2$ powder-producing step is minimum.

That is, by using a gadolinia content set in the $UO_2$ powder-producing step, the effective neutron multiplication factor of a $UO_2$ system concerning an array of fuel pellets containing a reactor fuel with a uranium enrichment of greater than 5% by weight, a bundle of reactor fuel rods, or a fuel assembly is restricted to be less than or equal to the effective neutron multiplication factor of a fuel pellet, reactor fuel rod, or fuel assembly with a uranium enrichment of 5% by weight. Likely, the constraint conditions are satisfied.

Figure 5:
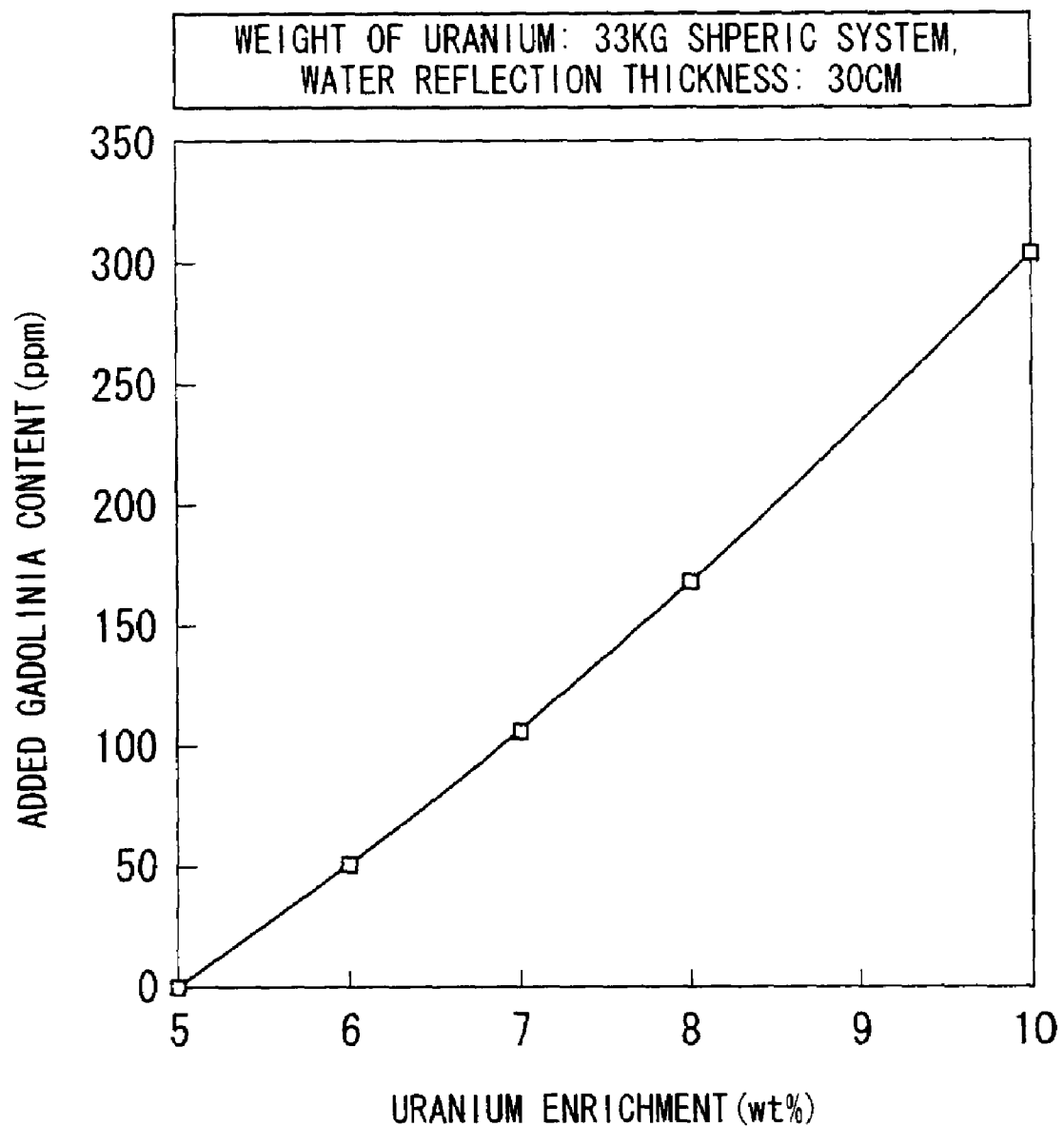
FIG. 5 is a graph showing the relationship between an amount of gadolinia added to $UO_2$ powders used in the method according to the first embodiment and the uranium enrichment (5% to 10% by weight) of the $UO_2$ powders.

FIG. 5 is a graph showing the relationship between the amount of gadolinia added to the $UO_2$ powders with a uranium enrichment of greater than 5% by weight and the uranium enrichment of these $UO_2$ powders. The amount of gadolinia added to the $UO_2$ powder with a uranium enrichment of 5% by weight is 0 ppm. The amount of gadolinia added to the $UO_2$ powder with a uranium enrichment of 10% by weight is 305 ppm. The term "a uranium enrichment of 10% by weight" used herein covers a range from 9.5% to 10.0% by weight.

As shown in FIG. 5, the amount of gadolinia added to the $UO_2$ powders with a uranium enrichment of greater than 5% by weight is substantially proportional to the uranium enrichment of these $UO_2$ powders. Supposing that the uranium enrichment and the gadolinia content are limited to 10% by weight or less and 305 ppm or less, respectively, and are in proportion to each other, the gadolinia content can be readily determined by using a proportional constant of, for example, 61, the proportional constant being obtained by dividing the gadolinia content (305 ppm) of the $UO_2$ powder with a uranium enrichment of 10% by weight by 5. In view of criticality control, a control technique using this approximate straight line is more safe than a technique in which the content of gadolinia is calculated from the enrichment of uranium, because the content of gadolinia is determined to be relatively large.

In this embodiment, a number by which the gadolinia content (305 ppm) of the $UO_2$ powder with a uranium enrichment of 10% by weight is divided ranges from 4.5 to 5.5 because the lower limit and upper limit of the uranium enrichment range from 4.5% to 5.0% by weight and from 9.5% to 10.0% by weight, respectively.

According to this embodiment, as for the criticality control, a reactor fuel with a uranium enrichment of greater than 5% by weight can be treated on equal terms with a $UO_2$ powder with a uranium enrichment of 5% by weight by uniformly adding a slight amount of gadolinia to a $UO_2$ powder for fabricating the reactor fuel. Therefore, in a fuel fabrication facility, fabrication steps such as a step of handling a $UO_2$ powder, a step of forming fuel pellets, a step of fabricating a reactor fuel rod, a step of fabricating a fuel assembly, and a step of storing the fuel assembly can be controlled in the criticality control on equal terms with a step of handling the reactor fuel with a uranium enrichment of 5% by weight.

In fuel cycle steps including a fresh-fuel transport step, a fresh-fuel storage step, a spent-fuel storage step, and a spent-fuel transport step in addition to a fuel fabrication step, the effective neutron multiplication factors of a fuel storage pool and a spent-fuel transport/storage cask are held to be less than a constraint for ensuring subcriticality by making use of the reactivity-suppression effect of gadolinia, whereby cost increases due to design changes or equipment modifications can be prevented and fabrication costs can be prevented from being increased.

[Second Embodiment]

A method of producing a $UO_2$ powder according to a second embodiment of the present invention will be described hereunder with reference to FIGS. 6 to 8.

In order to produce a reactor fuel from the $UO_2$ powder, a burnable poison is uniformly added to the $UO_2$ powder. Therefore, the reactivity-suppression effect of the burnable poison can be used in a step of handling the $UO_2$ powder.

Figure 6:
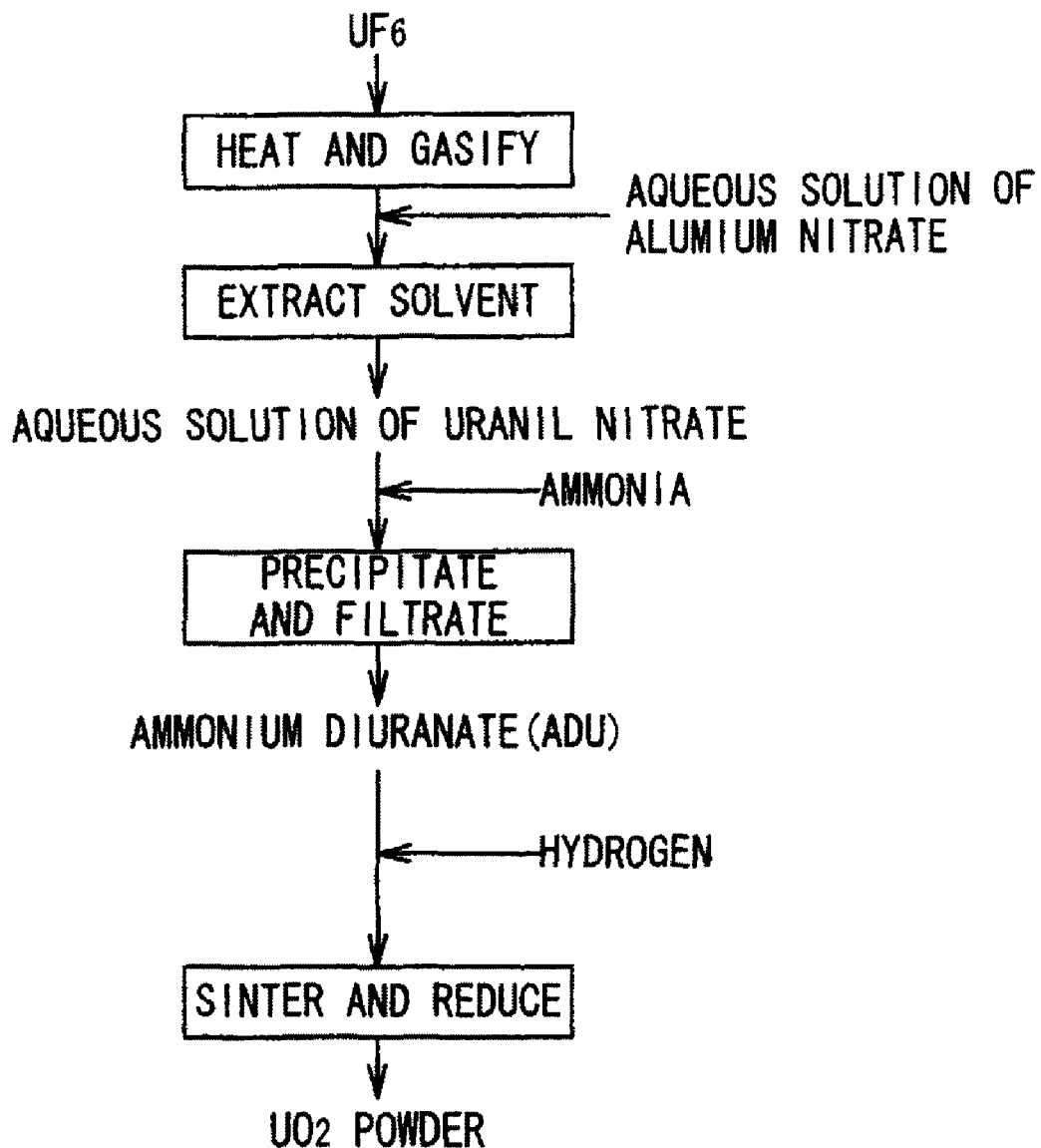
FIG. 6 is a flowchart showing a conventional method of producing a $UO_2$ powder through the reconversion of $UF_6$ by a solvent extraction process used in a method for producing a $UO_2$ powder according to a second embodiment of the present invention.

FIG. 6 is a flowchart showing a conventional method of producing a $UO_2$ powder through the reconversion of uranium hexafluoride ($UF_6$) by a solvent extraction process.

As shown in FIG. 6, $UF_6$ is added to an aqueous solution of aluminum nitrate, an aqueous solution of uranyl nitrate is thereby prepared. Ammonia is added to the aqueous uranyl nitrate solution, ammonium diuranate (ADU) is thereby precipitated, and the obtained precipitate is dehydrated, roasted, and then reduced, thus producing the conventional $UO_2$ powder.

Figure 7:
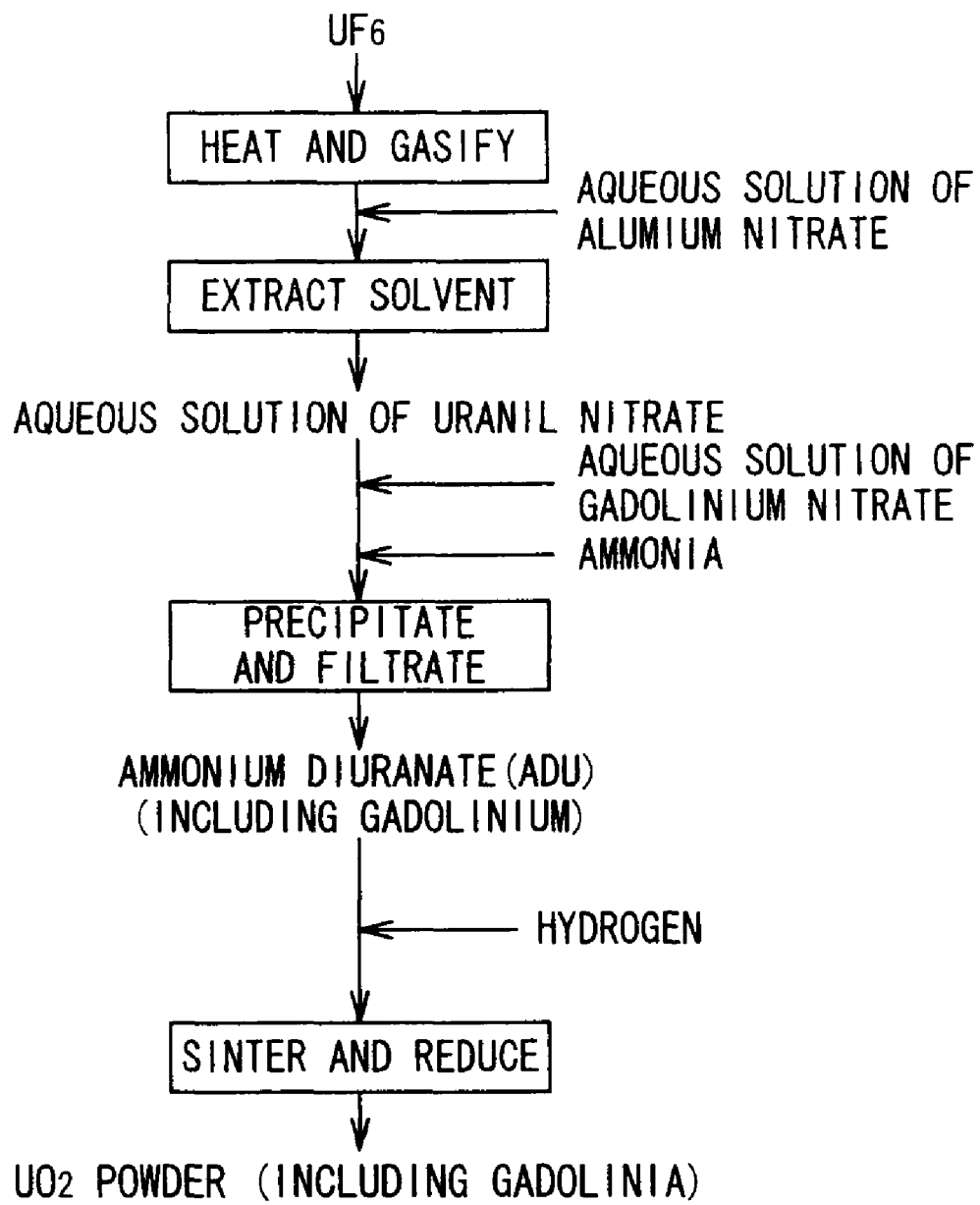
FIG. 7 is a flowchart showing the method according to the second embodiment in which a slight amount of an aqueous solution of gadolinium nitrate is used in a step of producing a $UO_2$ powder through the reconversion of $UF_6$ by a solvent extraction process such that a powder mixture of gadolinia and $UO_2$ is prepared.

FIG. 7 is a flowchart showing the method of this embodiment. In the method, a slight amount of an aqueous solution of gadolinium nitrate is used in the process of producing the $UO_2$ powder through the reconversion of $UF_6$ by a solvent extraction process such that a uniform powder mixture of gadolinia and $UO_2$ is obtained.

According to the method of this embodiment, as shown in FIG. 7, a slight amount of the aqueous gadolinium nitrate solution is added to an aqueous solution of uranyl nitrate obtained by a solvent extraction process, and a uniform solution is then prepared. A uniform powder mixture containing $UO_2$ and a slight amount of gadolinia is produced from ammonium diuranate (ADU) containing gadolinia. Since the uniform solution is prepared by adding a slight amount of the aqueous gadolinium nitrate solution to the aqueous uranyl nitrate solution, gadolinia and $UO_2$ are uniformly mixed together in the $UO_2$ powder.

A wet ADU process and the like are examples of a process of producing another $UO_2$ powder. The wet ADU process may include a step of preparing an aqueous solution of uranyl nitrate and a step of adding an aqueous solution of gadolinium nitrate to this aqueous uranyl nitrate solution. This allows a $UO_2$ powder in which $UO_2$ and a slight amount of gadolinia are uniformly mixed together to be produced.

Figure 8:
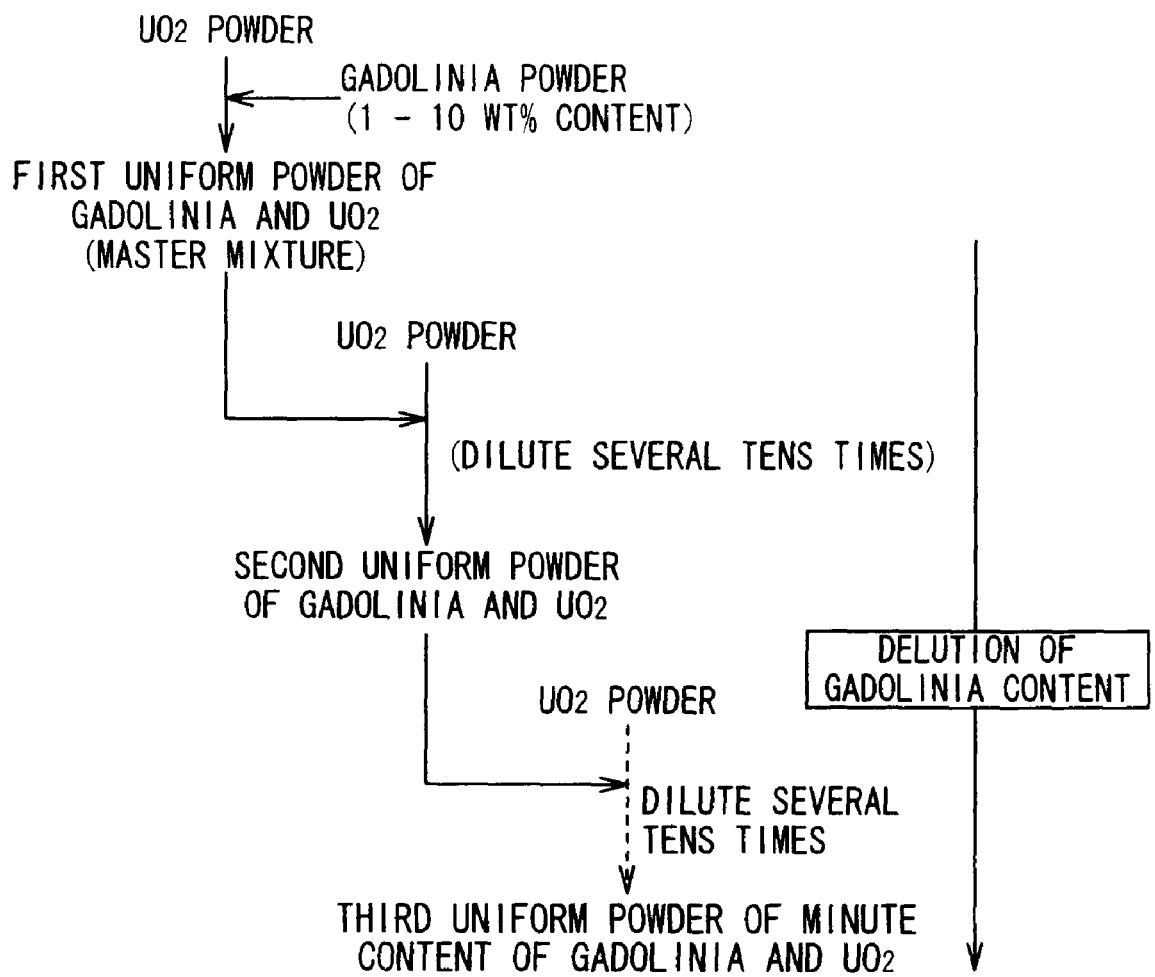
FIG. 8 is an illustration showing a technique for adding gadolinia to a $UO_2$ powder treated in a fuel fabrication step of the method according to the second embodiment.

Alternatively, as shown in FIG. 8, after a $UO_2$ powder is received, a first powder mixture is prepared by uniformly mixing the $UO_2$ powder and a gadolinium powder together so as to have a gadolinium content of about 1% to 10% by weight. A second powder mixture is prepared by uniformly mixing the first powder mixture and the received $UO_2$ powder together such that the content of the first powder mixture in the second powder mixture is about 1% to 10% by weight. A third powder mixture is prepared by uniformly mixing the second powder mixture and the $UO_2$ powder together such that the content of the second powder mixture in the third powder mixture is about 1% to 10% by weight. This allows the third powder mixture to have a gadolinia content of about 0.1% by weight or less. That is, a burnable poison-containing powder mixture in which the gadolinia powder and the $UO_2$ powder are uniformly mixed and which has a gadolinia powder content of less than 0.1% by weight can be produced by repeating the step of mixing or diluting the gadolinia powder with an about tenfold amount of the $UO_2$ powder several times.

[Third Embodiment]

A reactor fuel rod according to a third embodiment of the present invention will be described hereunder with reference to FIG. 9.

Figure 9:
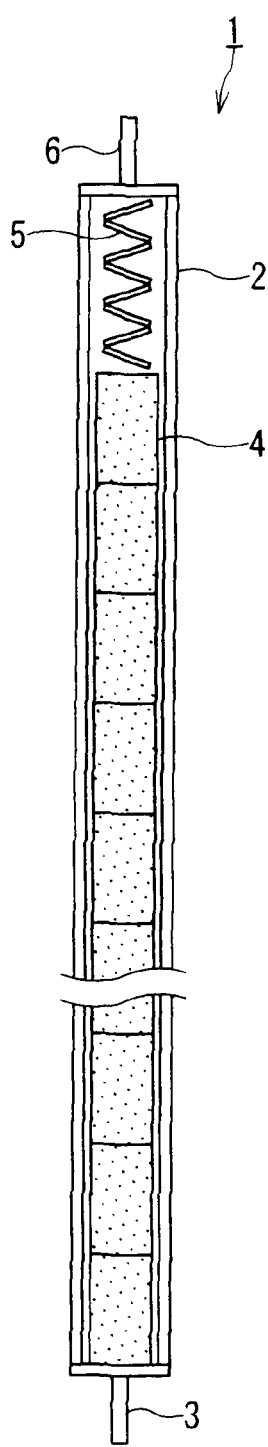
FIG. 9 is a schematic sectional view of a reactor fuel rod, according to a third embodiment of the present invention, including fuel pellets made from a $UO_2$ powder containing a slight amount of gadolinia.

FIG. 9 is a schematic sectional view of the reactor fuel rod 1.

The reactor fuel rod 1 includes a cylindrical fuel cladding tube 2 including: a lower-end plug 3 welded to the lower end thereof; cylindrical fuel pellets 4 which are packed in the fuel cladding tube 2 and which are made from a $UO_2$ powder containing a slight amount of gadolinia; a plenum spring 5, placed in an upper hollow portion of the fuel cladding tube 2, for pressing the fuel pellets 4; and an upper-end plug 6 welded to the lower end of the fuel cladding tube 2.

The $UO_2$ powder contains, for example, less than 0.1% by weight of gadolinia. The fuel pellets 4 are produced by sintering the $UO_2$ powder. In particular, the $UO_2$ powder is pressed into blanks with a predetermined shape. The blanks are heat-treated in a reducing atmosphere so as to be sintered, to thereby obtain the fuel pellets 4. The fuel pellets 4 have high density and high mechanical strength and are chemically stable. The fuel pellets 4 are ground so as to have a predetermined size. The fuel pellets 4 can be produced by a known process.

According to this embodiment, as for criticality control, fuel pellets and reactor fuel rods with a uranium enrichment of greater than 5% by weight can be treated on equal terms with a reactor fuel with a uranium enrichment of 5% by weight or less. That is, a $UO_2$ powder with a gadolinia content of less than 0.1% by weight can be processed into a reactor fuel by a process similar to a process for fabricating a conventional reactor fuel rod, and hence, a reactor fuel rod with a uranium enrichment of greater than 5% by weight can be fabricated without modifying a fuel-processing facility.

[Fourth Embodiment]

A fuel assembly, according to a fourth embodiment of the present invention, for light-water reactors will be described hereunder with reference to FIGS. 10 to 13.

FIG. 10 is an illustration showing the two-dimensional arrangement pattern of a design example of a conventional replacement fuel assembly (used for two-year operation-cycle, having an average burnup of about 70 GWd/t), having an average uranium enrichment of about 6.2% by weight, for boiling-water reactors and also showing that of a replacement fuel assembly including reactor fuel rods 1 fabricated using $UO_2$ powders which slightly contain, for example, less than 0.1% by weight of gadolinia and which have a uranium enrichment of greater than 5% by weight.

The fuel assembly of this embodiment includes reactor fuel rods fabricated using $UO_2$ powders which slightly contain, for example, less than 0.1% by weight of gadolinia and which have a uranium enrichment of greater than 5% by weight.

These reactor fuel rods are classified into three types: reactor fuel rods fabricated using a $UO_2$ powder which contains, for example, 53 ppm gadolinia and which has a uranium enrichment of 6% by weight; reactor fuel rods fabricated using a $UO_2$ powder which contains, for example, 110 ppm gadolinia and which has a uranium enrichment of 7% by weight; and reactor fuel rods fabricated using a $UO_2$ powder which contains, for example, 170 ppm gadolinia and which has a uranium enrichment of 8% by weight.

Figure 11:
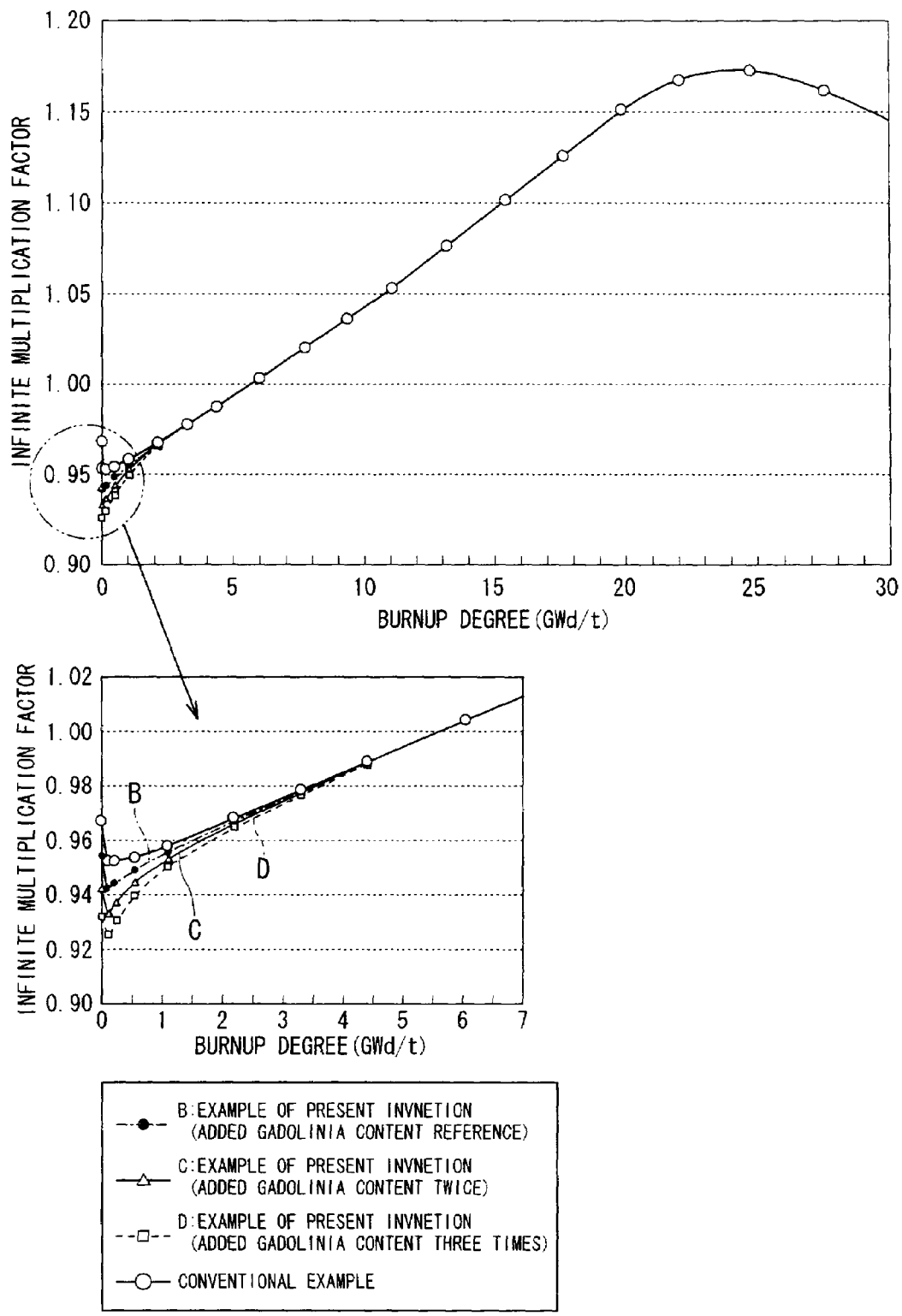
FIG. 11 is an illustration showing the infinite multiplication factor of a design example of a conventional replacement fuel assembly, having an average uranium enrichment of about 6.2% by weight, for boiling-water reactors and also showing that of a fuel assembly, according to the fourth embodiment, including reactor fuel rods fabricated using a $UO_2$ powder which slightly contains, for example, less than 0.1% by weight of gadolinia and which has a uranium enrichment of greater than 5% by weight, the replacement fuel assemblies being under operation (a void fraction of 40%)
Figure 12:
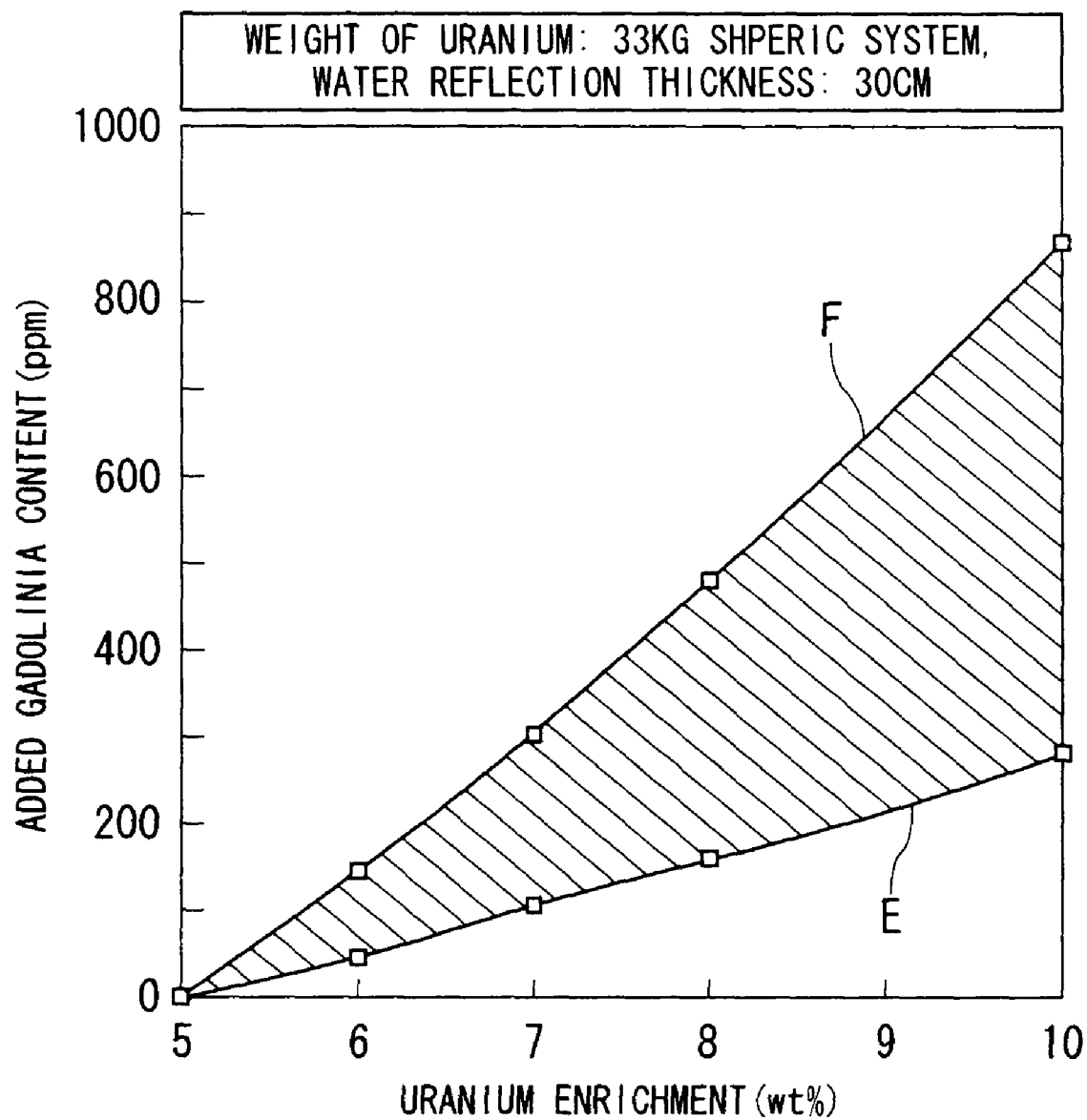
FIG. 12 is a graph showing the relationship between gadolinia content and uranium enrichment (uranium enrichment of 5% to 10% by weight) of a $UO_2$ powder contained in the fuel assembly according to the fourth embodiment.

FIG. 11 shows the infinite multiplication factor of a design example of a conventional replacement fuel assembly, having an average uranium enrichment of about 6.2% by weight, for boiling-water reactors and also shows that of a replacement fuel assembly including reactor fuel rods fabricated using a $UO_2$ powder which slightly contains, for example, less than 0.1% by weight of gadolinia and which has a uranium enrichment of greater than 5% by weight, the replacement fuel assemblies being under operation (a void fraction of 40%).

With reference to FIG. 11, Line "B" represents the relationship between the infinite multiplication factor and burnup of the fuel assembly of this embodiment.

Line "C" represents the relationship between the infinite multiplication factor and burnup of a fuel assembly including reactor fuel rods fabricated using $UO_2$ powders which have a uranium enrichment of greater than 5% by weight and a gadolinia content that is about two times greater than that of the $UO_2$ powders used to fabricate the reactor fuel rods included in the fuel assembly of this embodiment.

The fuel assembly represented by the Line "C" includes: reactor fuel rods fabricated using a $UO_2$ powder having a gadolinia content of 106 ppm and a uranium enrichment of 6% by weight, reactor fuel rods fabricated using a $UO_2$ powder having a gadolinia content of 220 ppm and a uranium enrichment of 7% by weight; and reactor fuel rods fabricated using a $UO_2$ powder having a gadolinia content of 340 ppm and a uranium enrichment of 8% by weight.

Line "D" represents the relationship between the infinite multiplication factor and burnup of a fuel assembly including reactor fuel rods fabricated using $UO_2$ powders which have a uranium enrichment of greater than 5% by weight and a gadolinia content that is about three times greater than that of the $UO_2$ powders used to fabricate the reactor fuel rods included in the fuel assembly of this embodiment.

The fuel assembly represented by the Line "D" includes: reactor fuel rods fabricated using a $UO_2$ powder having a gadolinia content of 159 ppm and a uranium enrichment of 6% by weight; reactor fuel rods fabricated using a $UO_2$ powder having a gadolinia content of 330 ppm and a uranium enrichment of 7% by weight; and reactor fuel rods fabricated using a $UO_2$ powder having a gadolinia content of 510 ppm and a uranium enrichment of 8% by weight.

As shown in FIG. 11, the difference between the infinite multiplication factor of the conventional fuel assembly and that of each fuel assembly represented by the Line "B", "C" or "D" is small, that is, about 1% to 3% Δk in an initial stage of burning, and hence, the influence on the reactivity of a reactor core is slight. The fuel assembly of this embodiment has a difference in infinite multiplication factor of about 1% Δk, and hence, a conventional design need not be modified. The fuel assemblies including the reactor fuel rods fabricated using the $UO_2$ powders having a uranium enrichment of greater than 5% by weight and a gadolinia content that is about two or three times greater than that of the $UO_2$ powders used to fabricate the reactor fuel rods included in the fuel assembly of this embodiment have a small difference in infinite multiplication factor of about 2% and 3% Δk, respectively. Accordingly, a conventional design need not be modified or needs to be slightly changed in the number of reactor fuel rods with a high gadolinia content, the gadolinia content thereof, or the arrangement of the reactor fuel rods.

The difference between the infinite multiplication factor of the conventional fuel assembly and that of the fuel assembly of this embodiment decreases with the progress of burning and disappears at a cycle burnup of about 5 GWd/t or more (corresponding to half-year operation). Therefore, the reactivity loss caused by gadolinia in a final stage of an operation cycle is negligible.

A $UO_2$ powder with a uranium enrichment of 10% by weight may have a gadolinia content of up to 915 ppm, which is three times greater than the gadolinia content (305 ppm) of the $UO_2$ powder, described in the first embodiment, having a uranium enrichment of 10% by weight. $UO_2$ powders with a uranium enrichment of greater than 5% by weight may have a gadolinia content that is up to three times greater than those described in the first embodiment. The content of gadolinia can be determined in a hatched region sandwiched between Lines "E" and "F" in FIG. 12. The content of gadolinia in a reactor fuel with a uranium enrichment of greater than 5% by weight is less than about 0.1% by weight.

According to this embodiment, as for the criticality control, a fuel assembly with a uranium enrichment of greater than 5% by weight can be treated on equal terms with a reactor fuel with a uranium enrichment of 5% by weight or less. That is, a reactor fuel rod can be fabricated by a process, similar to a process for fabricating a conventional reactor fuel rod, using a $UO_2$ powder having a gadolinia content of, for example, less than 0.1% by weight and a uranium enrichment of 5% by weight or more. Accordingly, a fuel assembly with a uranium enrichment of greater than 5% by weight can be obtained with no equipment modifications.

Gadolinia, which is slightly contained in a fuel assembly, rapidly burns out in an initial stage of burning and therefore causes no reactivity loss in a final stage of an operation cycle. Hence, gadolinia can meet an increase in economic efficiency due to the use of reactor fuels with a uranium enrichment of greater than 5% by weight.

The fuel assembly of this embodiment can be used for boiling-water reactors including reactor fuel rods having different uranium enrichments as described above and can be used for pressurized-water reactors including reactor fuel rods having a single uranium enrichment.

Figure 13:
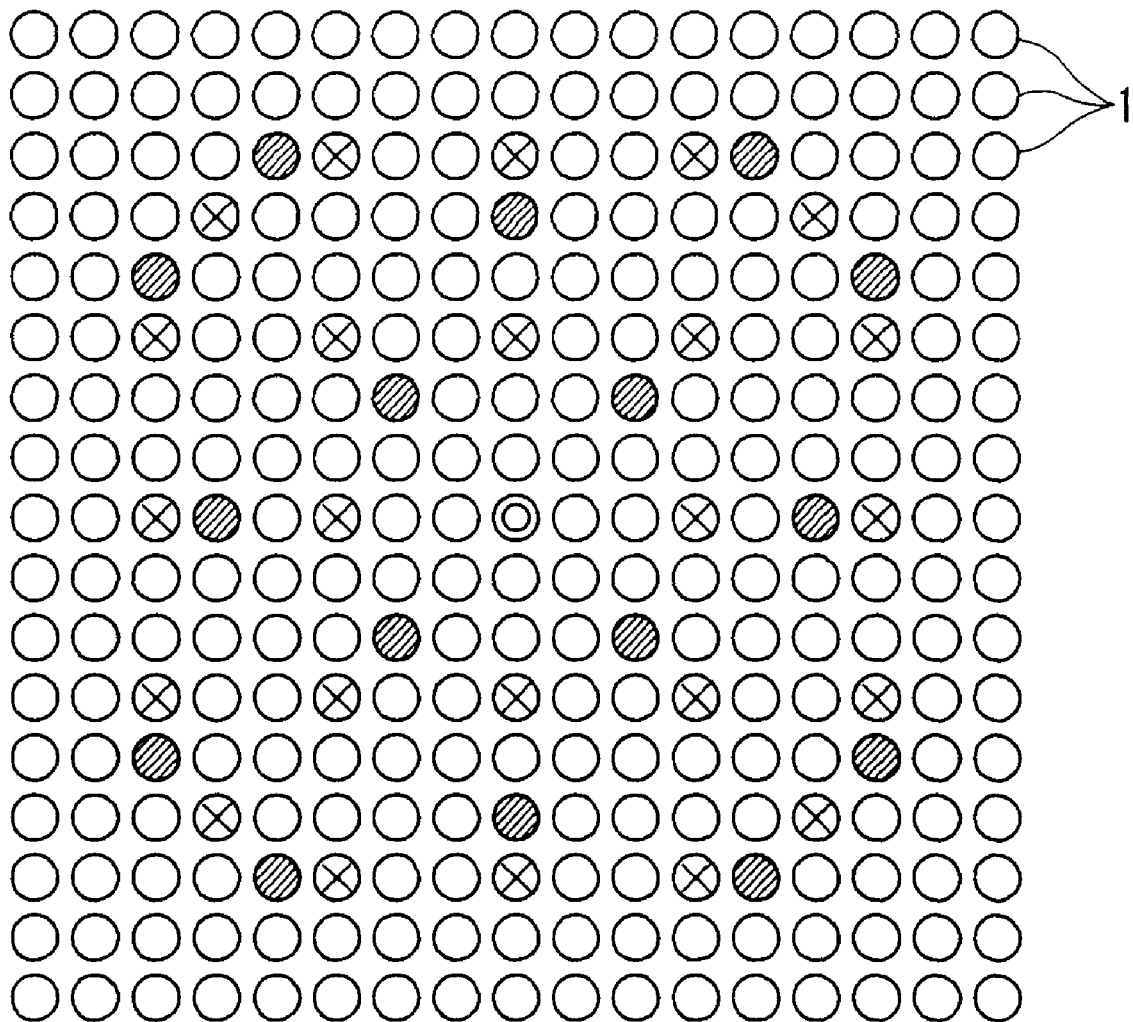
FIG. 13 is a schematic plan view showing reactor fuel rods, having a uranium enrichment of greater than 5% by weight, containing a slight amount of gadolinia, the reactor fuel rods being arranged in a fuel assembly for pressurized-water reactors, the fuel assembly being a modification of the fuel assembly according to the fourth embodiment.

FIG. 13 is an illustration showing reactor fuel rods arranged in a fuel assembly for pressurized-water reactors. The reactor fuel rods have a uranium enrichment of greater than 5% by weight and contain a slight amount of gadolinia. This fuel assembly is a modification of the fuel assembly of this embodiment. Another modification of the fuel assembly of this embodiment may include reactor fuel rods, having a uranium enrichment of 5% by weight or less, placed in corner and/or peripheral portions thereof so as to provide a uniform power distribution.

The fuel assembly of this embodiment may contain borosilicate glass or another material serving as a burnable poison.

The fuel assembly of this embodiment has only a slight influence on the initial reactivity of a reactor core and no unburned portion of gadolinia remains in reactor fuel rods arranged in the fuel assembly of this embodiment in a final stage of an operation cycle, thereby preventing reactivity loss. Therefore, the number of fresh fuel rods for replacement and fuel cycle costs can be greatly reduced by increasing the enrichment of reactor fuels, which is the purpose of using reactor fuels with a uranium enrichment of greater than 5%.

[Fifth Embodiment]

A method, according to a fifth embodiment of the present invention, for controlling the criticality of a nuclear fuel cycle facility will be described hereunder with reference to FIGS. 14 and 15.

In the case of handling fuel assemblies including reactor fuel rods with a uranium enrichment of greater than 5% by weight or handling fuel assemblies which have a maximum uranium enrichment of 5% by weight or less and which include reactor fuel rods with an average uranium enrichment of 4.5% to 5% by weight, there may be some constrains on fuel storage pools and spent-fuel transport/storage casks because effective neutron multiplication factors have been used to control criticality without any regard for the reactivity-suppression effect of unburned gadolinia.

According to the method of this embodiment, a reactor fuel having the largest effective neutron multiplication factor over the entire period of burning is supposed in consideration that a reactor fuel rod containing a slight amount, for example, less than 0.1% by weight of gadolinia or a large amount of gadolinia is treated in a fuel fabrication step. Accordingly, the subcriticality of the fuel storage pools and spent-fuel transport/storage casks, which are used to store the fuel assemblies, is ensured such that influences on measures on criticality control are reduced.

Figure 14:
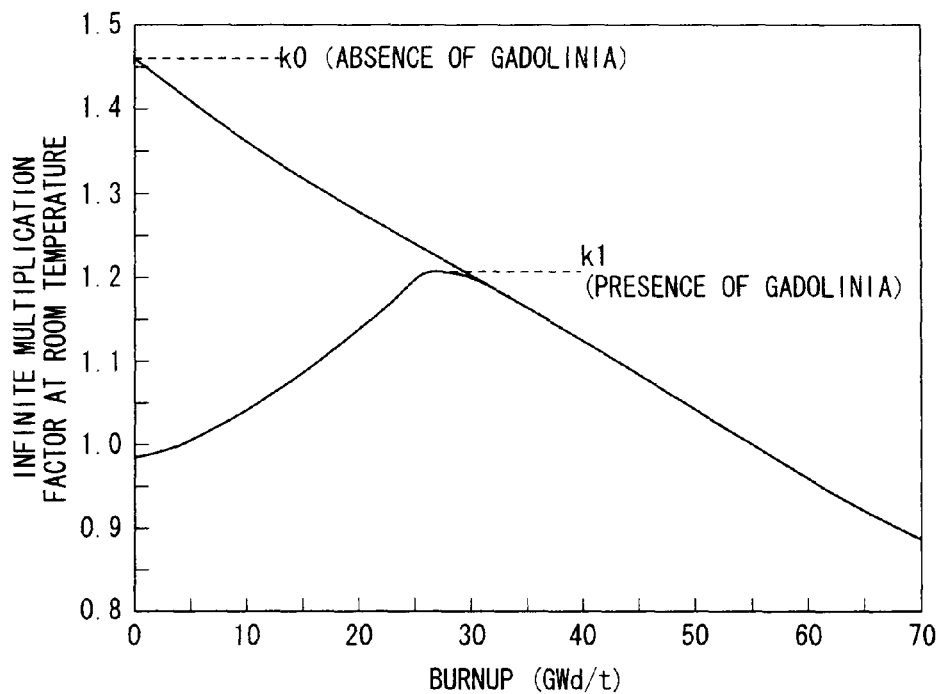
FIG. 14 is a graph which illustrates a method, according to a fifth embodiment of the present invention, for controlling the criticality of a nuclear fuel cycle facility and which shows the relationship between the infinite neutron multiplication factor and burnup of a reactor fuel for boiling-water reactors at low temperature, the reactor fuel including reactor fuel rods with a high gadolinia content.

FIG. 14 is a graph showing the relationship between the infinite neutron multiplication factor and burnup of a system including fuel assemblies infinitely arranged at low temperature, the system being an example of a reactor fuel, including reactor fuel rods with high gadolinia content, for boiling-water reactors. The maximum infinite neutron multiplication factor k1 of the reactor fuel containing gadolinia is less than the infinite neutron multiplication factor k0 of a reactor fuel containing no gadolinia.

Figure 15:
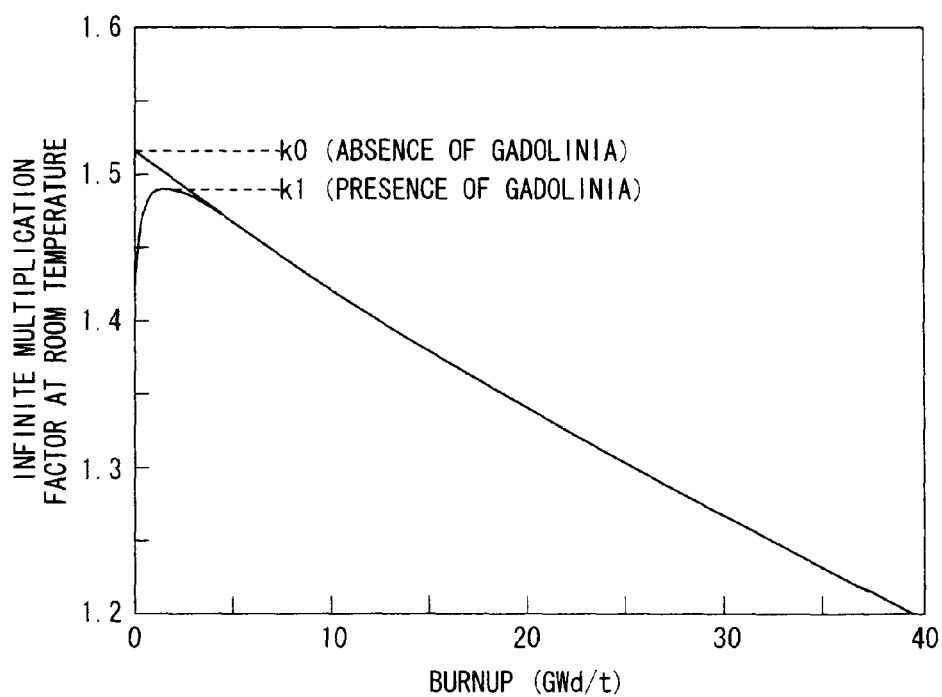
FIG. 15 is a graph which illustrates the method according to the fifth embodiment and which shows the relationship between the infinite neutron multiplication factor and the burnup of a reactor fuel, having a gadolinia content of 100 ppm, for pressurized-water reactors at low temperature.

FIG. 15 is a graph showing the relationship between the infinite neutron multiplication factor and burnup of a reactor fuel, having a gadolinia content of 100 ppm, for pressurized-water reactors at low temperature. The maximum infinite neutron multiplication factor k1 of the reactor fuel containing gadolinia is less than the infinite neutron multiplication factor k0 of a reactor fuel containing no gadolinia.

That is, the reactivity of a reactor fuel can be reduced by adding a large or slight amount of gadolinia to this reactor fuel. Therefore, the maximum infinite neutron multiplication factor k1 of a fuel assembly containing this reactor fuel over the entire period of burning can be used instead of the infinite neutron multiplication factor k0 of the fuel assembly that has been conventionally determined without any regard for the reactivity-reducing effect of unburned gadolinia. This allows the effective neutron multiplication factor of a fuel storage pool and spent-fuel transport/storage cask for storing the fuel assembly to be reduced, thereby ensuring the subcriticality of the fuel storage pool and the spent-fuel transport/storage cask.

In this embodiment, gadolinia, which is a rare-earth oxide, is used as a burnable poison. Samarium oxide, which has a large neutron absorption cross-section, may be used instead of gadolinia.

In the case where there are constraints on criticality control when a fuel assembly is handled in a fuel storage pool or a spent-fuel transport/storage cask, the method of this embodiment can be used even if the fuel assembly has a uranium enrichment of 5% by weight or less. That is, in the case where there are constraints on criticality control when the fuel assembly is stored, the use of the method of this embodiment is effective in preventing an increase in cost due to modifications such as design modifications and/or equipment modifications because the method of this embodiment assumes the fuel assembly as a reactor fuel having a maximum effective neutron multiplication factor over the entire period of burning.

According to the above embodiments, a slight amount of gadolinia is uniformly added to a $UO_2$ powder for producing a reactor fuel with a uranium enrichment of greater than 5% by weight. Therefore, costs, relating to criticality safety, for modifying fuel fabrication facilities and fabrication costs can be prevented from being increased. Furthermore, no unburned portion of gadolinia remains in a final stage of an operation cycle, and therefore, no reactivity loss is caused. The number of fresh fuel rods for replacement can be reduced because of an increase in the enrichment of a reactor fuel, and hence, economic efficiency can be increased.

When there may be constraints on the criticality control of not only reactor fuels with a uranium enrichment of greater than 5% by weight but also current fuel assemblies including fuel rods with a maximum enrichment of 5% by weight or less, influences on measures for ensuring the subcriticality of fuel storage pools and spent-fuel transport/storage casks can be reduced in such a manner that the reactor fuels are assumed as reactor fuels having the maximum reactivity over the entire period of burning in consideration that reactor fuel rods containing a slight or large amount of gadolinia are treated in a fuel fabrication step.

It is further to be noted that the present invention is not limited to the described embodiments and many other changes and modifications may be made without departing from the scope of the appended claims.

What is claimed is:

1. A method of controlling the criticality of a nuclear fuel cycle facility, comprising:

producing a reactor fuel by adding from 305 to 915 ppm of gadolinia to a uranium dioxide powder with a uranium enrichment of greater than 5% and 10% or less by weight;

controlling an effective neutron multiplication factor of a uranium dioxide system containing the uranium dioxide powder to which gadolina is added to be less than or equal to a maximum of an effective neutron multiplication factor of a uranium dioxide system with a uranium enrichment of 5% by weight;

ensuring a control of a mass subcriticality by:
not handling any fuel having a mass exceeding a predetermined value relating to criticality safety design;
not handling any fuel having a size exceeding a size of a predetermined value relating to criticality safety design; and
maintaining the fuel under complete submergence conditions such that spaces between particles of the uranium dioxide powder with a uranium enrichment are filled with water and the particles are surrounded by water;

wherein the control of the effective neutron multiplication factor is obtained by adding an amount of gadolinia to the enriched uranium dioxide powder such that the maximum of the effective neutron multiplication factor of the enriched uranium dioxide powder is less than or equal to an effective neutron multiplication factor of uranium dioxide powder with a uranium enrichment of 5% by weight, and the amount of gadolinia added to the uranium dioxide powder with a uranium enrichment of greater than 5% by weight is proportional to the uranium enrichment thereof that exceeds 5% and a constant of the proportion is determined by dividing the amount of gadolinia added to a uranium dioxide powder with a uranium enrichment of 10% by weight by five.

* * * * *